United States Patent [19]

Kanda

[11] Patent Number: 5,057,993
[45] Date of Patent: Oct. 15, 1991

[54] METHOD AND SYSTEM FOR ACQUIRING PARAMETERS IN PROCESS CONTROL

[75] Inventor: Masae Kanda, Kawagoe, Japan

[73] Assignee: Kabushiki Kaisha Toshiba, Kawasaki, Japan

[21] Appl. No.: 464,194

[22] Filed: Jan. 12, 1990

[30] Foreign Application Priority Data

Jan. 13, 1989 [JP] Japan ..................................... 1-6216

[51] Int. Cl.$^5$ .............................................. G05B 13/04
[52] U.S. Cl. .................................. 364/162; 364/165; 364/150
[58] Field of Search ................ 364/148, 149, 150, 154, 364/160, 162, 164, 165

[56] References Cited

U.S. PATENT DOCUMENTS

| | | | |
|---|---|---|---|
| 3,798,426 | 3/1974 | Bristol, II | 364/158 |
| 4,607,326 | 8/1986 | Mori et al. | 364/162 |
| 4,674,029 | 6/1987 | Maudal | 364/148 |
| 4,881,160 | 1/1989 | Sakai et al. | 364/161 |
| 4,983,898 | 1/1991 | Kanda | 318/561 |

FOREIGN PATENT DOCUMENTS 0119765 9/1984 European Pat. Off. .
2600789 12/1987 France .
59-167707 9/1984 Japan .
63-138402 6/1988 Japan .

*Primary Examiner*—Jerry Smith
*Assistant Examiner*—Paul Gordon
*Attorney, Agent, or Firm*—Oblon, Spivak, McClelland, Maier & Neustadt

[57] ABSTRACT

In a process control system prior to execution of process control, a manipulated variable to which an identification signal from an identification signal generator is added is inputted to a process. In a preadaptation section, a controlled variable output from the process is sampled to obtain its dead time and maximum gradient, and the initial values of PID control parameters are calculated on the basis of the dead time and the maximum gradient. The initial values of PID control parameters and the like are set in the adaptation section. In the adaptation section, a pulse transfer function of the process is acquired, and PID control parameters are calculated from the acquired pulse transfer function by using a partial matching method in a frequency region. After these PID control parameters are set in a control section, process control is executed.

9 Claims, 4 Drawing Sheets

METHOD AND SYSTEM FOR ACQUIRING PARAMETERS IN PROCESS CONTROL

BACKGROUND OF THE INVENTION

1. Field of the Invention

The present invention relates to a method and system for acquiring parameters in process control.

2. Description of the Related Art

In a process control system for monitoring and controlling a process state, various types of adaptive control apparatuses, for example, a sample value control apparatus (Published Unexamined Japanese Patent Application No. 59-167707) having a closed loop autotuning function and an adaptive control apparatus (U.S. Pat. No. 3,798,426) having a pattern recognizing function, are used. In the sample value control apparatus the dynamic characteristics of a process are estimated by inputting an identification signal to a process control system, and control parameters are determined on the basis of the estimated dynamic characteristics.

In such an adaptive control apparatus, when PID (Proportional plus Integral plus Derivative) control parameters used for a PID operation are to be determined, a reference model for defining a process control system and characteristic parameters representing a process state must be set.

Conventionally, characteristic parameters are set by an operator in an adaptive control apparatus before a process control is executed.

Alternatively, in a conventional adaptive control apparatus, a reference model, i.e., design data is stored in advance and is read out as needed so as to obtain characteristic parameters on the basis of the readout design data (Published Unexamined Japanese Patent Application No. 63-138402). Therefore, an operation performed by an operator becomes complicated.

Under these circumstances, a strong demand has arisen for an adaptive control apparatus capable of easily and automatically acquiring various parameters used for a PID operation or the like.

SUMMARY OF THE INVENTION

It is an object of the present invention to provide a method and system for acquiring parameters in process control.

According to one aspect of the present invention, there is provided a method for acquiring parameters in process control, the method comprising the steps of:

selecting one of an opened loop mode and a closed loop mode;

generating an identification signal;

subtracting a controlled variable output from the process from a set value to obtain a difference value, the controlled variable is used in the subtraction when the closed loop mode is selected;

controlling a manipulated variable in accordance with the difference value;

adding the identification signal to the manipulated variable so as to supply an added value to the process;

sampling the added value and the controlled variable outputted from the process in response to the added value during a desired period to obtain sampling values;

acquiring primary control parameters by detecting characteristic parameters representing a state of the process from the sampling values, when the opened loop mode is selected; and acquiring process control parameters by matching a characteristic model of the process estimated from the sampling values.

According to another aspect of the present invention, there is provided a system for acquiring parameters in process control, the system comprising:

a process to be controlled;

mode selected means for selecting one of an opened loop mode and a closed loop mode;

generating means for generating an identification signal;

subtracting means for subtracting a controlled variable outputted from the process from a set value to obtain a difference value, the controlled variable supplied to the subtracting means when the closed loop mode is selected;

controlling means for controlling a manipulated variable in accordance with the difference value;

adding means for adding the identification signal to the manipulated variable so as to supply an added value to the process;

sampling means for sampling the added value and the controlled variable outputted from the process in response to the added value during a desired period to obtain sampling values;

first acquiring means for acquiring primary control parameters by detecting characteristic parameters representing a state of the process from the sampling values, when the opened loop mode is selected; and second acquiring means for acquiring process control parameters by matching a characteristic model of the process estimated from the sampling values.

DETAILED DESCRIPTION OF THE PREFERRED EMBODIMENTS

An embodiment of the present invention will be described below with reference to the accompanying drawings.

Figure 1:
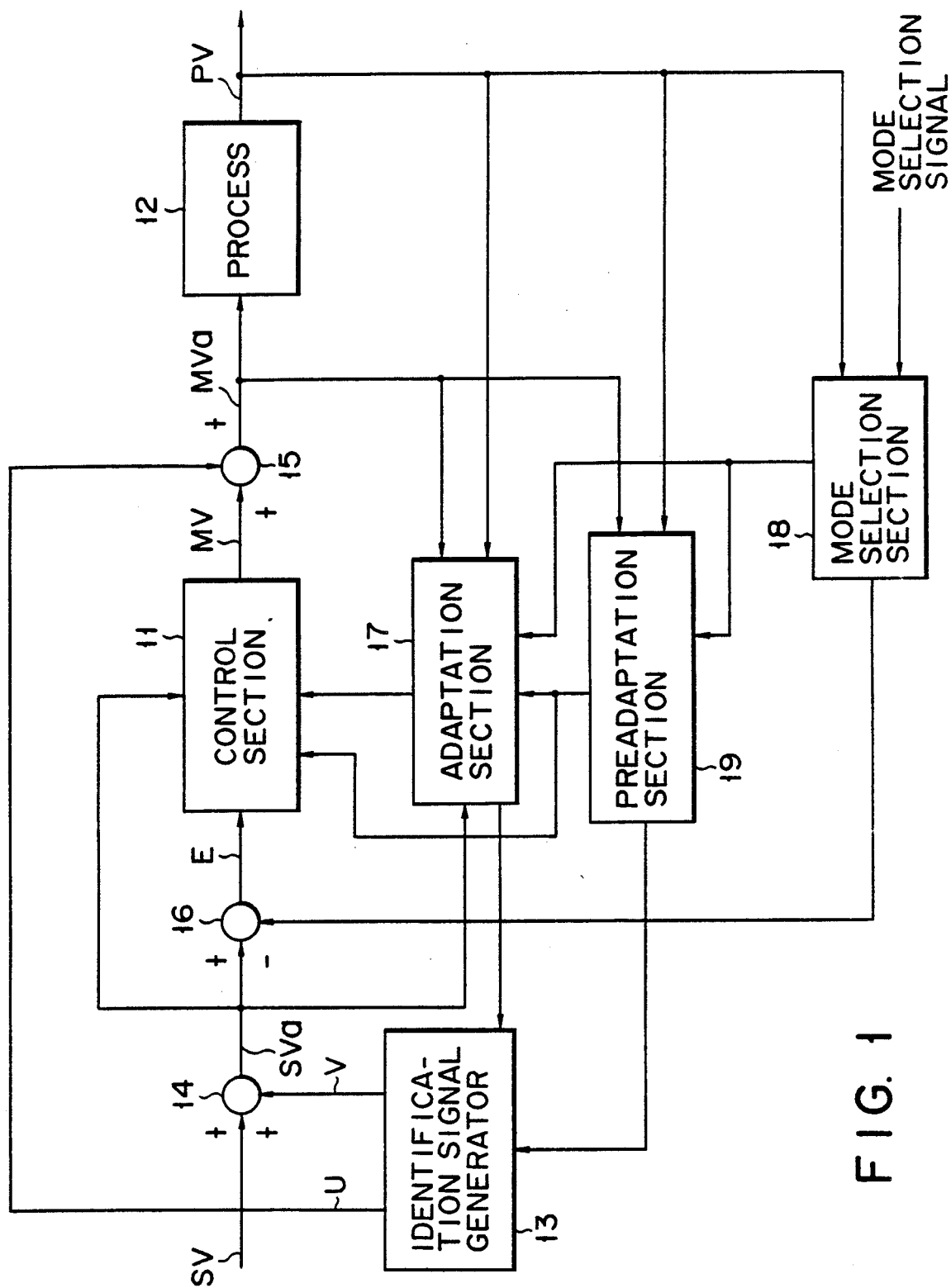
FIG. 1 is a block diagram showing an arrangement of a system according to an embodiment of the present invention.

Referring to FIG. 1, a system comprises a control section 11, a process 12, an identification signal generator 13, adders 14 and 15, a subtractor 16, an adaptation section 17, a mode selection section 18, and a preadaptation section 19.

The identification signal generator 13 generates identification signals V and U. When the system is identified, the identification signal V is outputted to the adder 14. When the process 12 is identified, the identification signal U is outputted to the adder 15. In this embodiment, a case wherein the process 12 is identified will be described below.

Figure 2A:
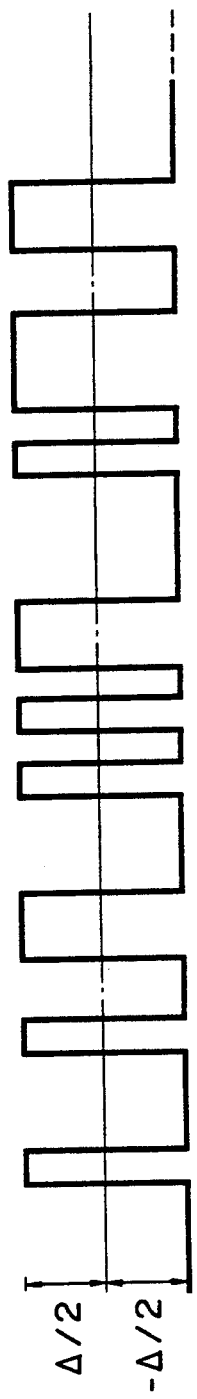
FIGS. 2A and 2B show examples of identification signals.
Figure 2B:
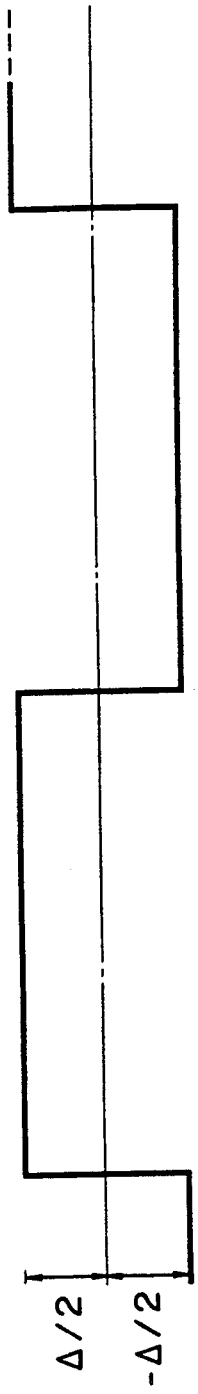

For example, an M-series signal (FIG. 2A) or a step signal (FIG. 2B) is used as the identification signals V and U generated by the identification signal generator 13. Small variations ±Δ/2 are given to each of a set value SV and a manipulated variable MV by using the identification signals V and U. The amplitudes of the identification signals V and U are set to be small values so as not to influence an operation of the system. Note that if an M-series signal is used, identification of a process or the like can be performed with high precision in a wide frequency band.

The adder 14 adds the identification signal V to the set value SV, and outputs an added value SVa to the subtractor 16, the control section 11, and the adaptation section 17.

The subtractor 16 subtracts a controlled variable PV from the added value SVa, and outputs a deviation E to the control section 11.

The control section 11 performs a PID operation by using PID control parameters so as to set the deviation E to be zero, and outputs the manipulated variable MV to the adder 15.

The adder 15 adds the identification signal U to the manipulated variable MV, and outputs an added value MVa to the process 12, the adaptation section 17, and the preadaptation section 19.

The process 12 outputs a controlled variable PV in response to the added value MVa to the subtractor 16, the adaptation section 17, and the preadaptation section 19.

The adaptation section 1 calculates PID control parameters used for a PID operation in the control section 11, on the basis of a transfer function obtained by identifying the process 12.

The mode selection section 18 selects a closed loop mode or an opened loop mode in accordance with a mode selection signal input from the outside. In the closed loop mode, the manipulated variable MV is determined on the basis of the controlled variable PV and the like. In the opened loop mode, the manipulated variable MV is determined without feeding back the controlled variable PV. Note that in the opened loop mode, the mode selection section 18 supplies commands to the preadaptation section 19 so as to output a predetermined manipulated variable MV from the control section 11 for a predetermined period and to output a predetermined identification signal U from the identification signal generator 13 for a predetermined period.

The preadaptation section 19 acquires characteristic parameters of the process 12, such as a dead time and a maximum gradient, on the basis of the controlled variable PV output from the process 12, and calculates the initial values of PID control parameters in accordance with the acquired dead time and maximum gradient. Note that if initial values cannot be calculated because a maximum gradient cannot be obtained or the like, a control operation is stopped.

An operation of the system will be described below.

When a mode selection signal representing the opened loop mode is input from the outside to the mode selection section 18, the section 18 stops supply of the controlled variable PV so as not to input it to the subtractor 16, and then outputs an operation signal to the preadaptation section 19.

Upon reception of the operation signal from the mode selection section 18, the preadaptation section 19 outputs a control signal to the control section 11 so as to output the predetermined manipulated variable MV for a predetermined period. The section 19 then outputs a generation signal to the identification signal generator 13 so as to generate a predetermined identification signal U.

Figure 3:
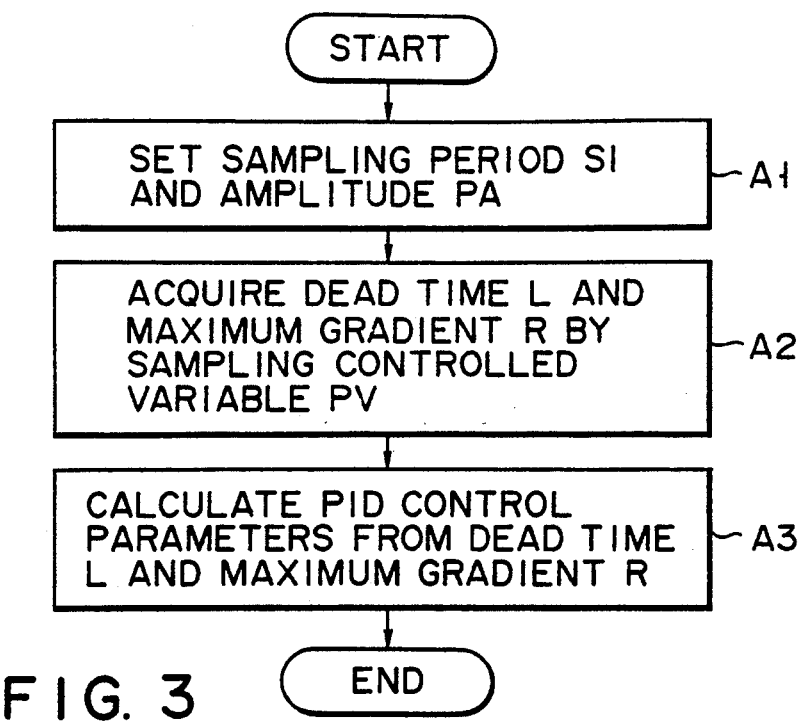
FIG. 3 is a flow chart showing an operation of a preadaptation section.

An operation of the preadaptation section 19 will be described below in accordance with a flow chart shown in FIG. 3.

In step A1, a sampling period SI for the controlled variable PV, an amplitude PA of the identification signal U added to the manipulated variable MV, and the like are set in advance. Note that the sampling period SI is set in accordance with the response time of the process 12, and that the amplitude PA of the identification signal U is set to be a small value within a range in which characteristic parameters can be acquired.

In step A2, a dead time and a maximum gradient are acquired by sampling the controlled variable PV output from the process 12. More specifically, for example, the step-formed identification signal U (a step signal corresponding to +Δ/2 in FIG. 2B) generated by the identification signal generator 13 is added to the manipulated variable MV, and the added value MVa is input to the process 12. A dead time L1 and a maximum gradient R1 of the process 12 are acquired by sampling the controlled variable PV. In addition, an inverted, step-formed identification signal U (a step signal corresponding to −Δ/2 in FIG. 2B) is added to the manipulated variable MV. A dead time L2 and a maximum gradient R2 of the process 12 are acquired in the same manner as described above.

Average values R and L of the dead times and the maximum gradients can be obtained by the following equations:

$$R = (R1 + R2)/2 \tag{1}$$

$$L = (L1 + L2)/2 \tag{2}$$

In this case, by using the step response method of Ziegler-Nichols, PID control parameters can be represented by the average values R and L as follows:

$$\text{proportional gain } Kp = 1.2/RL \tag{3}$$

$$\text{integral time } Ti = 2L \tag{4}$$

$$\text{derivative time } Td = 0.5L \tag{5}$$

In step A3, the initial values of the PID control parameters are calculated according to equations (3) to (5). These initial values are set in the control section 11.

As described above, in the preadaptation section 19, the initial values of the PID control parameters are calculated in accordance with the characteristic parameters obtained by using the identification signals.

In contrast to this, when a mode selection signal representing the closed loop mode is input from the outside to the mode selection section 18, the section 18 outputs the controlled variable PV from the process 12 to the subtractor 16, and further outputs an operation signal to the adaptation section 17 and an operation stop signal to the preadaptation section 19. At this time, the preadaptation section 19 supplies the initial values of acquired PID control parameters and the like to the adaptation section 17.

Figure 4:
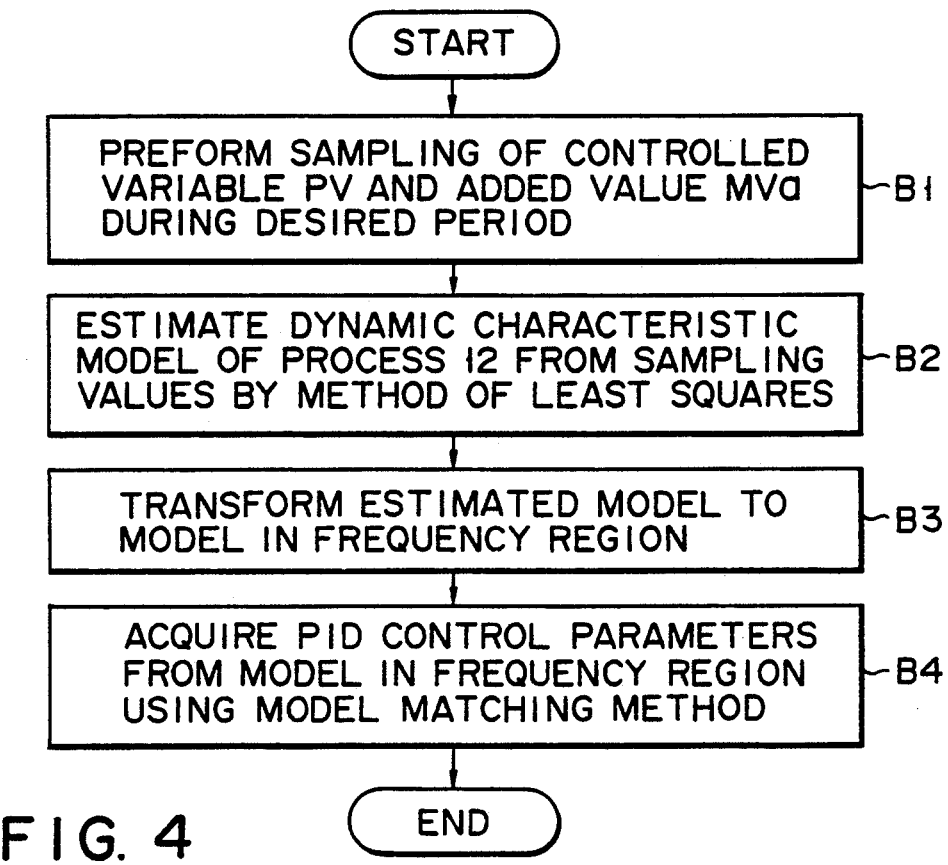
FIG. 4 is a flow chart showing an operation of an adaptation section.

An operation of the adaptation section 17 will be described below in accordance with a flow chart shown in FIG. 4. Note that the initial values of the PID control parameters, the sampling period SI, the amplitude PA of the identification signal U, and the like supplied from the preadaptation section 19 are used by the adaptation section 17. In addition, it is determined in advance whether or not filtering process is performed in an identification of a process to be described later.

In step B1, the added value MVa (manipulated variable MV+ identification signal U) and the controlled variable PV are sampled in a predetermined period.

In step B2, a dynamic characteristic model of the process 12 is estimated o the basis of the sampled added value MVa and controlled variable PV by using a sequential least squares method. That is, the pulse transfer function of the process 12 can be obtained.

In step B3, the estimated dynamic characteristic model is transformed into a model in a frequency region.

In step B4, PID control parameters are calculated on the basis of the model (the pulse transfer function) in the frequency region by using a partial model matching method. That is, in the partial model matching method, the PID control parameters are acquired by matching the response characteristics in the frequency region of a predetermined reference model with those of the estimated dynamic characteristic model.

As described above, the PID control parameters are calculated in the adaptation section 17 and set in the control section 11. Process control is executed by using these PID control parameters.

As has been described above, according to the present invention, an operator need not calculate various parameters or input calculated parameters, unlike the conventional method.

The present invention has been described with reference to the particular embodiment. However, the present invention is not limited to this. Various changes and modifications can be made within the spirit and scope of the invention.

Figure 5:
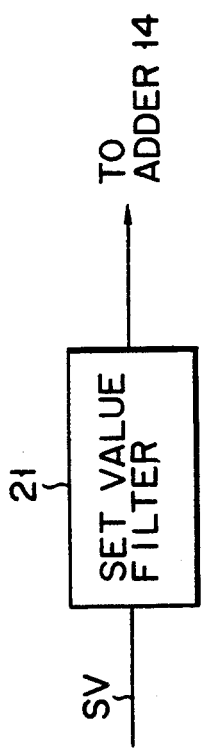
FIG. 5 is a block diagram showing the position of a set value filter.

For example, as shown in FIG. 5, a set value SV may be input to a set value filter 21 before it is inputted to the adder 14.

Figure 6:
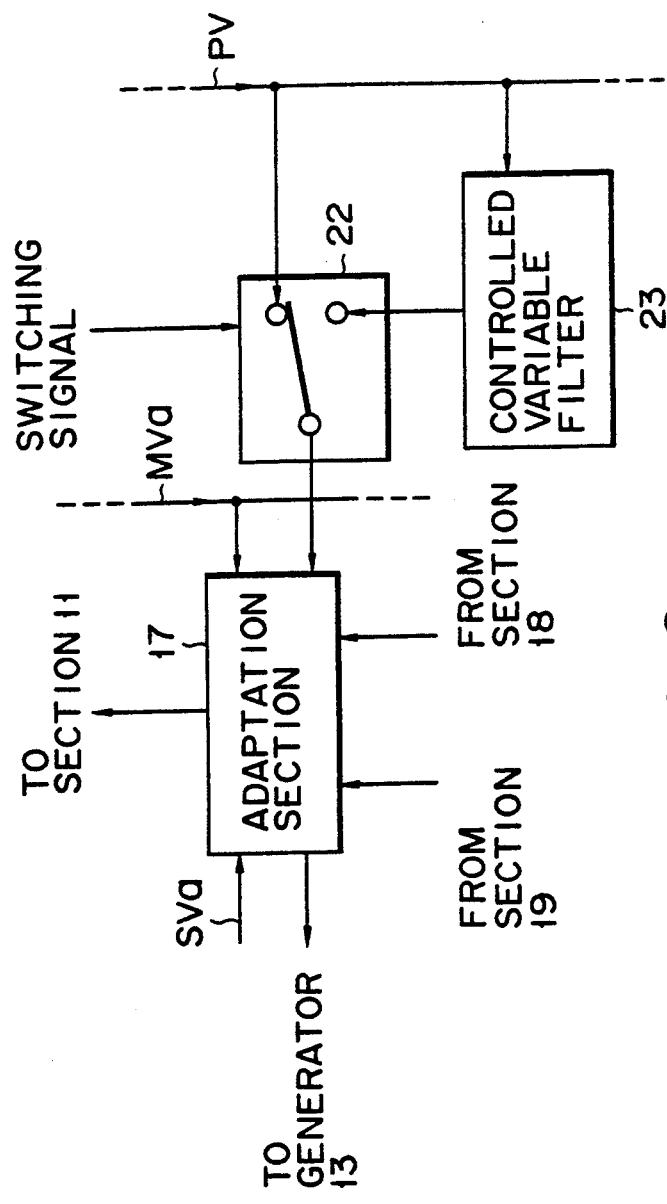
FIG. 6 is a block diagram showing the position of a controlled variable filter.

In addition, as shown in FIG. 6, a controlled variable PV may be inputted to the adaptation section 17 using a switch 22. In a normal case, a controlled variable PV is inputted to the adaptation section 17 through the switch 22. If many external disturbances are present, the switch 22 is switched by a switching signal so as to input a controlled variable PV to the adaptation section 17 through a controlled variable filter 23.

The above embodiment has been described with reference to a PID operation. However, the same processing can be performed with respect to a PI operation and a PD operation.

In the above embodiment, the preadaptation section 19 calculates the initial values of PID control parameters by the step response method of Ziegler-Nichols. However, the initial values of PID control parameters can be calculated by other methods.

What is claimed is:

1. A method for acquiring parameters in process control, the method comprising the steps of:
   selecting one of an opened loop mode and a closed loop mode;
   generating an identification signal;
   subtracting a controlled variable output from the process from a set value to obtain a difference value, the controlled variable is used in the subtraction when the closed loop mode is selected;
   controlling a manipulated variable in accordance with the difference value;
   adding the identification signal to the manipulated variable so as to supply an added value to the process;
   sampling the added value and the controlled variable outputted from the process in response to the added value during a desired period to obtain sampling values;
   acquiring primary control parameters by detecting characteristic parameters representing a state of the process from the sampling values, when the opened loop mode is selected; and
   acquiring process control parameters by matching a characteristic model of the process estimated from the sampling values.

2. The method according to claim 1, wherein the manipulated variable is controlled in accordance with one of the primary control parameters and the process control parameters.

3. The method according to claim 1, wherein the characteristic parameters include a dead time and a gradient.

4. A system for acquiring parameters in process control, the system comprising:
   a process to be controlled;
   mode selecting means for selecting one of an opened loop mode and a closed loop mode;
   generating means for generating an identification signal;
   subtracting means for subtracting a controlled variable outputted from the process from a set value to obtain a difference value, the controlled variable supplied to the subtracting means when the closed loop mode is selected;
   controlling means for controlling a manipulated variable in accordance with the difference value;
   adding means for adding the identification signal to the manipulated variable so as to supply an added value to the process;
   sampling means for sampling the added value and the controlled variable outputted from the process in response to the added value during a desired period to obtain sampling values;
   first acquiring means for acquiring primary control parameters by detecting characteristic parameters representing a state of the process from the sampling values, when the opened loop mode is selected; and
   second acquiring means for acquiring process control parameters by matching a characteristic model of the process estimated from the sampling values.

5. The system according to claim 4, wherein the manipulated variable is controlled in accordance with one of the primary control parameters and the process control parameters.

6. The system according to claim 4, wherein the characteristic parameters include a dead time and a gradient.

7. A system for acquiring parameters in process control, the system comprising:
   a process to be controlled;
   mode selecting means for selecting one of an opened loop mode and a closed loop mode;
   generating means for generating an identification signal;
   adding means for adding the identification signal to a set value to obtain an added value;

subtracting means for subtracting a controlled variable outputted from the process from the added value to obtain a difference value, the controlled variable supplied to the subtracting means when the closed loop mode is selected;

controlling means for controlling a manipulated variable in accordance with the difference value;

sampling means for sampling the manipulated value and the controlled variable outputted from the process in response to the manipulated value during a desired period to obtain sampling values;

first acquiring means for acquiring primary control parameters by detecting characteristic parameters representing a state of the process from the sampling values, when the opened loop mode is selected; and second acquiring means for acquiring process control parameters by matching a characteristic model of the process estimated from the sampling values.

8. The system according to claim 7, wherein the manipulated variable is controlled in accordance with one of the primary control parameters and the process control parameters.

9. The system according to claim 7, wherein the characteristic parameters include a dead time and a gradient.

* * * * *